(12) United States Patent
Yen

(10) Patent No.: US 9,122,470 B2
(45) Date of Patent: Sep. 1, 2015

(54) ELECTRONIC DEVICE WITH POWER CONTROL FUNCTION

(71) Applicant: Quanta Computer Inc., Kuei Shan Hsiang, Tao Yuan Shien (TW)

(72) Inventor: Wei-Ting Yen, Tao Yuan Shien (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 325 days.

(21) Appl. No.: 13/862,765

(22) Filed: Apr. 15, 2013

(65) Prior Publication Data

US 2014/0195827 A1 Jul. 10, 2014

(30) Foreign Application Priority Data

Jan. 7, 2013 (TW) .............................. 102100383 A

(51) Int. Cl.
*G06F 1/00* (2006.01)
*G06F 1/32* (2006.01)
*G06F 1/26* (2006.01)

(52) U.S. Cl.
CPC .. *G06F 1/263* (2013.01); *G06F 1/32* (2013.01)

(58) Field of Classification Search
CPC ..................................... G06F 1/26; G06F 1/32
USPC ................................................. 713/300, 340
See application file for complete search history.

(56) References Cited

U.S. PATENT DOCUMENTS

| | | | |
|---|---|---|---|
| 6,025,699 A * | 2/2000 | Cummings | 320/136 |
| 7,986,130 B2 | 7/2011 | Yen | |
| 8,854,012 B2 * | 10/2014 | Dai et al. | 320/150 |
| 2006/0132092 A1 * | 6/2006 | Hoffman et al. | 320/132 |
| 2008/0116852 A1 * | 5/2008 | Kuo | 320/136 |
| 2009/0072793 A1 * | 3/2009 | Chang et al. | 320/134 |
| 2009/0237033 A1 * | 9/2009 | Kanzaki et al. | 320/134 |

(Continued)

FOREIGN PATENT DOCUMENTS

| | | |
|---|---|---|
| TW | 200629625 | 8/2006 |
| TW | 200905945 | 2/2009 |

(Continued)

OTHER PUBLICATIONS

Taiwanese language office action dated Dec. 26, 2014.

(Continued)

*Primary Examiner* — Jaweed A Abbaszadeh
*Assistant Examiner* — Phil Nguyen
(74) *Attorney, Agent, or Firm* — McClure, Qualey & Rodack, LLP

(57) ABSTRACT

An electronic device is provided. The electronic device includes a main system processing a process, a power control unit and a battery module. The power control unit provides operating power to the main system via an external power source when the external power source has been connected, and detects whether the power control unit has received a battery protection signal. The battery module discharges with a self-discharge rate when the battery module has received the protection signal from the power control unit. When the power control unit has not received the battery protection signal, the power control unit provides a charging power to the battery module via the external power source. When the power control unit has received the battery protection signal, the power control unit does not provide the charging power to the battery module, and transmits the protection signal to the battery module.

9 Claims, 4 Drawing Sheets

(56) References Cited

U.S. PATENT DOCUMENTS

| | | | |
|---|---|---|---|
| 2010/0123436 A1* | 5/2010 | Herrod et al. | 320/132 |
| 2010/0246084 A1* | 9/2010 | Chan et al. | 361/103 |
| 2011/0121787 A1* | 5/2011 | Kim et al. | 320/134 |
| 2012/0206106 A1* | 8/2012 | Wang et al. | 320/136 |
| 2013/0063074 A1* | 3/2013 | Lin et al. | 320/107 |
| 2013/0086409 A1* | 4/2013 | Lu et al. | 713/340 |

FOREIGN PATENT DOCUMENTS

| | | |
|---|---|---|
| TW | M433678 | 7/2012 |
| TW | 201234738 | 8/2012 |

OTHER PUBLICATIONS

English language translation of abstract of TW 200629625 (published Aug. 16, 2006).

English language translation of abstract of TW 200905945 (published Feb. 1, 2009).

English language translation of abstract of TW M433678 (published Jul. 11, 2012).

English language translation of abstract of TW 201234738 (published Aug. 16, 2012).

\* cited by examiner

ELECTRONIC DEVICE WITH POWER CONTROL FUNCTION

CROSS REFERENCE TO RELATED APPLICATIONS

This Application claims priority of Taiwan Patent Application No. 102100383, filed on Jan. 7, 2013, the entirety of which is incorporated by reference herein.

TECHNICAL FIELD

The technical field relates to electronic devices, and more particularly, relates to electronic devices having a battery module and the power control method thereof.

BACKGROUND

Nowadays, powers of conventional electronic devices are provided by an external power source supply or a battery module. In general, when the electronic device is not connected to the external power source, the power of the electronic device is provided by the battery module. When the electronic device is connected to an external power source, the external power source provides power to the system of the electronic device, and charges the battery module. In addition, most users connect the external power source to the electronic device for long-run usage, therefore, the battery module is often charged and continuously maintained at high power capacity. However, such usage may cause the accelerated aging of the battery module, and shorten the lifespan of the battery module. Therefore, an improved power control method is needed.

SUMMARY

An embodiment of an electronic device is provided for executing a process or a program. The electronic device includes a main system, a power control unit and a battery module. The main system processes the process. The power control unit provides operating power to the main system via an external power source when the power control unit is connected to the external power source, and detects whether the power control unit has received a battery protection signal. The battery module discharges with a self-discharge rate when the battery module has received the protection signal from the power control unit. When the power control unit has not received the battery protection signal, the power control unit provides a charging power to the battery module via the external power source. When the power control unit has received the battery protection signal, the power control unit does not provide the charging power to the battery module, and transmits the protection signal to the battery module.

BRIEF DESCRIPTION OF DRAWINGS

The invention will become more fully understood by referring to the following detailed description with reference to the accompanying drawings, wherein.

DESCRIPTION OF EMBODIMENTS

The making and using of the embodiments of the present disclosure are discussed in detail below. It should be appreciated, however, that the embodiments provide many applicable inventive concepts that can be embodied in a wide variety of specific contexts. The specific embodiments discussed are merely illustrative of specific ways to make and use the disclosure, and do not limit the scope of the disclosure.

Figure 1:
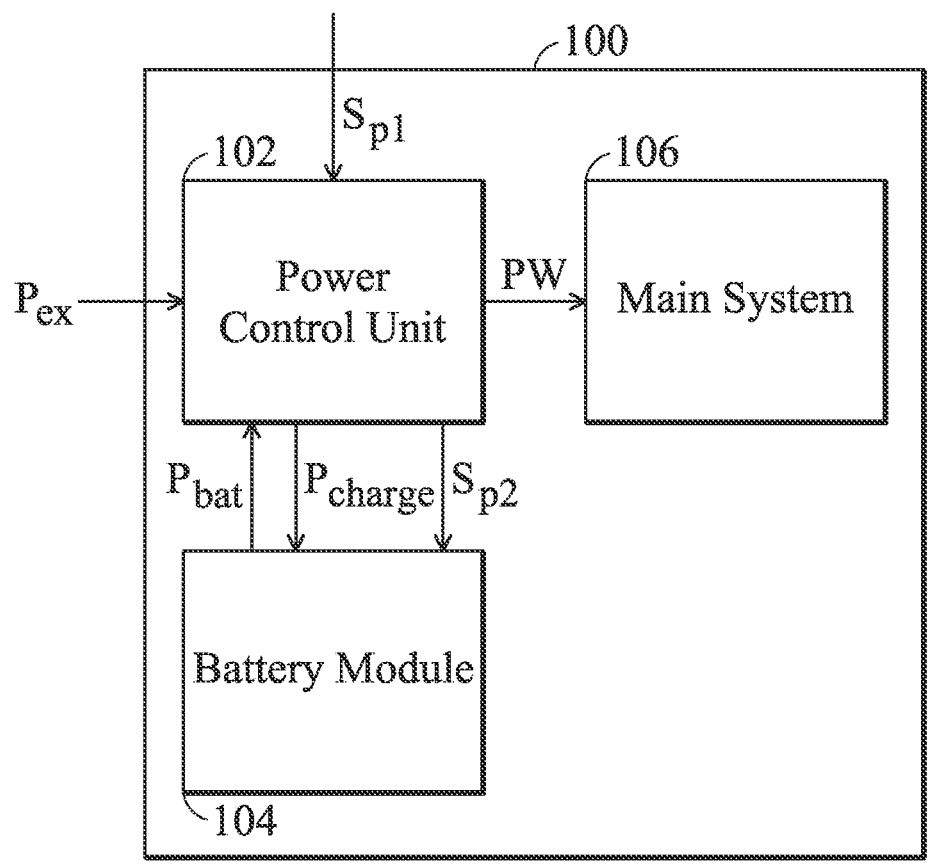
FIG. 1 is a schematic diagram illustrating an embodiment of an electric device 100.

FIG. 1 is a schematic diagram illustrating an embodiment of an electronic device 100. The electronic device 100 comprises a power control unit 102, a battery module 104 and a main system 106. The power control unit 102 detects whether the electronic device 100 is connected to an external power source Pex, and determines whether to provide operating power PW to the main system 106 via the external power source Pex or the battery module 104, accordingly. For example, when the external power source Pex is connected to the power control unit 102, the power control unit 102 generates the operating power PW via the external power source Pex, and provides the operating power PW to the main system 106. On the other hand, when the external power source Pex is not connected to the power control unit 102, the power control unit 102 generates the operating power PW via the battery power Pbat by the battery module 104, and provides the operating power PW to the main system 106. In some embodiments, when the external power source Pex is connected to the power control unit 102, the power control unit 102 also generates a charging power Pcharge via the external power source Pex, and provides the charging power Pcharge to the battery module 104 for charging. In some embodiments, the power control unit 102 may comprise an AC/DC converter, wherein the AC/DC converter can convert the external power source Pex into the operating power PW or the charging power Pcharge with DC power when the external power source Pex is AC power. It should be noted that, the invention is not limited thereto.

When the battery module 104 is not charged, the battery module 104 obtains a temperature parameter (such as a current operating temperature) to determine its self-discharge rate. In general, the self-discharge rate rises as the temperature rises. The power control unit 102 processes data transmissions with the battery module 104 via a communication interface (such as System Management Bus or SMBus). The main system 106 is configured to processes the main operations of the electronic device 100, such as executing programs or operating. For example, the electronic device 100 may be a notebook or a tablet computer, and the main system 106 may comprise a motherboard, a storage unit, a display, an input unit, and so on.

Figure 2:
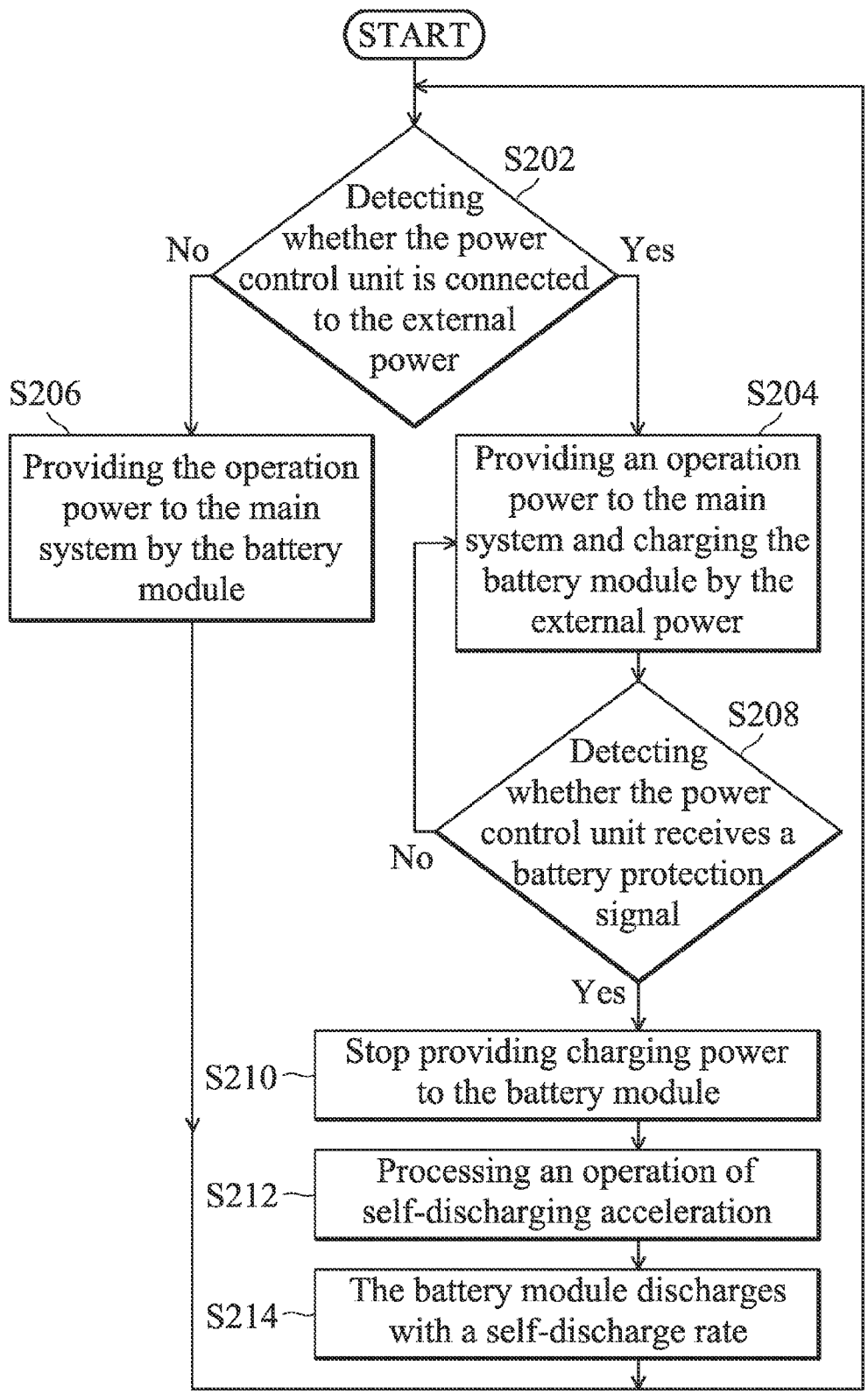
FIG. 2 is the operation flowchart of an embodiment of a method for the electric device 100 shown in FIG. 1.

The power control method of the present invention is described hereinafter according to FIG. 2, and FIG. 2 is the operation flowchart illustrating an embodiment of a power control method for the electronic device 100 shown in FIG. 1.

In step S202, the power control unit 102 determines whether is connected to the external power source $P_{ex}$ has been connected. When the power control unit 102 is connected to the external power source $P_{ex}$, step S204 is performed. When the power control unit 102 is not connected to the external power source $P_{ex}$, step S206 is performed. In some embodiments, the power control unit 102 may comprise a comparator coupled to the external power source $P_{ex}$, and whether the power control unit 102 is connected to the external power source $P_{ex}$ is determined according to the output result from the comparator.

In step S206, the power control unit 102 generates the operating power PW via the battery power Pbat by the battery module 104, and provides the operating power PW to the main system 106. Next, in step S202, the power control unit 102 continues to determine whether the power control unit 102 is connected to the external power source Pex.

In step S204, the power control 102 generates the operating power PW via the external power source Pex, and provides the operating power PW to the main system 106. Also, the power control unit 102 generates a charging power Pcharge via the external power source Pex, and provides the charging power Pcharge to the battery module 104 for charging. Next, in step S208, the power control unit 102 determines whether a battery saving protection signal Sp1 has been received. When the power control unit 102 has received the battery saving protection signal Sp1, step S210 is performed. On the other hand, when the power control unit 102 has not received the battery saving protection signal Sp1, step S204 is performed. In some embodiments, the battery saving protection signal Sp1 may be generated by a program executed by the main system 106 or an input button of the electronic device 100. For example, if a user needs to perform the battery protection, the user may push the corresponding button to transmit the battery saving protection signal Sp1 to the power control unit 102, and the power control unit 102 will perform the battery protection operation, accordingly.

Next, in step S210, the power control unit 102 stops providing the charging power $P_{charge}$ to the battery module 104, and transmits a protection signal $S_{p2}$ to the battery module 104. For example, the power control unit 102 may comprise a charging transistor connected between the charging power $P_{charge}$ and the battery module 104. When the power control unit 102 has received the battery saving protection signal $S_{p1}$, the power control unit 102 turns off the charging transistor, such that the charging power $P_{charge}$ is not provided to the battery module 104. In order to increase the self-discharge rate of the battery module, the self-discharge rate may be dynamically changed in step S212. The dynamical changing process is later described in detail in accordance with FIG. 3.

Next, in step S214, the battery module 104 stops changing the self-discharge rate dynamically and discharges with a self-discharge rate. Next, step S202 is performed, wherein the power control unit 102 continues to determine whether the power control unit 102 is connected to the external power source $P_{ex}$. It should be noted that, due to the self-discharge rate of the battery module 104 not being controlled in step S214, the self-discharge rate of the battery module 104 is the self-discharge rate under a nature state.

Based on the power control method described above, due to the battery module 104 not being charged in step S210, the battery module 104 can discharge when the external power source $P_{ex}$ is still connected to the power control unit 102. Therefore, the battery module 104 will not be at a high power all the time, and the lifespan of the battery module can be increased.

Furthermore, in order to let the user know the state of the power control, when the battery module 104 switches to the self-discharge state or the power control unit 102 has received the battery saving protection signal $S_{p1}$, the main system 106 can remind the user via a sound of a speaker or an image of a display, and the user can choose whether to proceed with a next operation.

In some embodiments, the power control unit 102 continues determining whether the power control unit 102 is connected to the external power source $P_{ex}$. For example, in step S212, when the power control unit 102 is not connected to the external power source $P_{ex}$ (ex. a user removes the external power source $P_{ex}$ from the electronic device 100), the power control unit 102 provides the operating power PW to the main system 106 by the power $P_{bat}$ of the battery module 104 instead. Conversely, when the power control unit 102 is still connected to the external power source $P_{ex}$, the power control unit 102 does not change.

Figure 3:
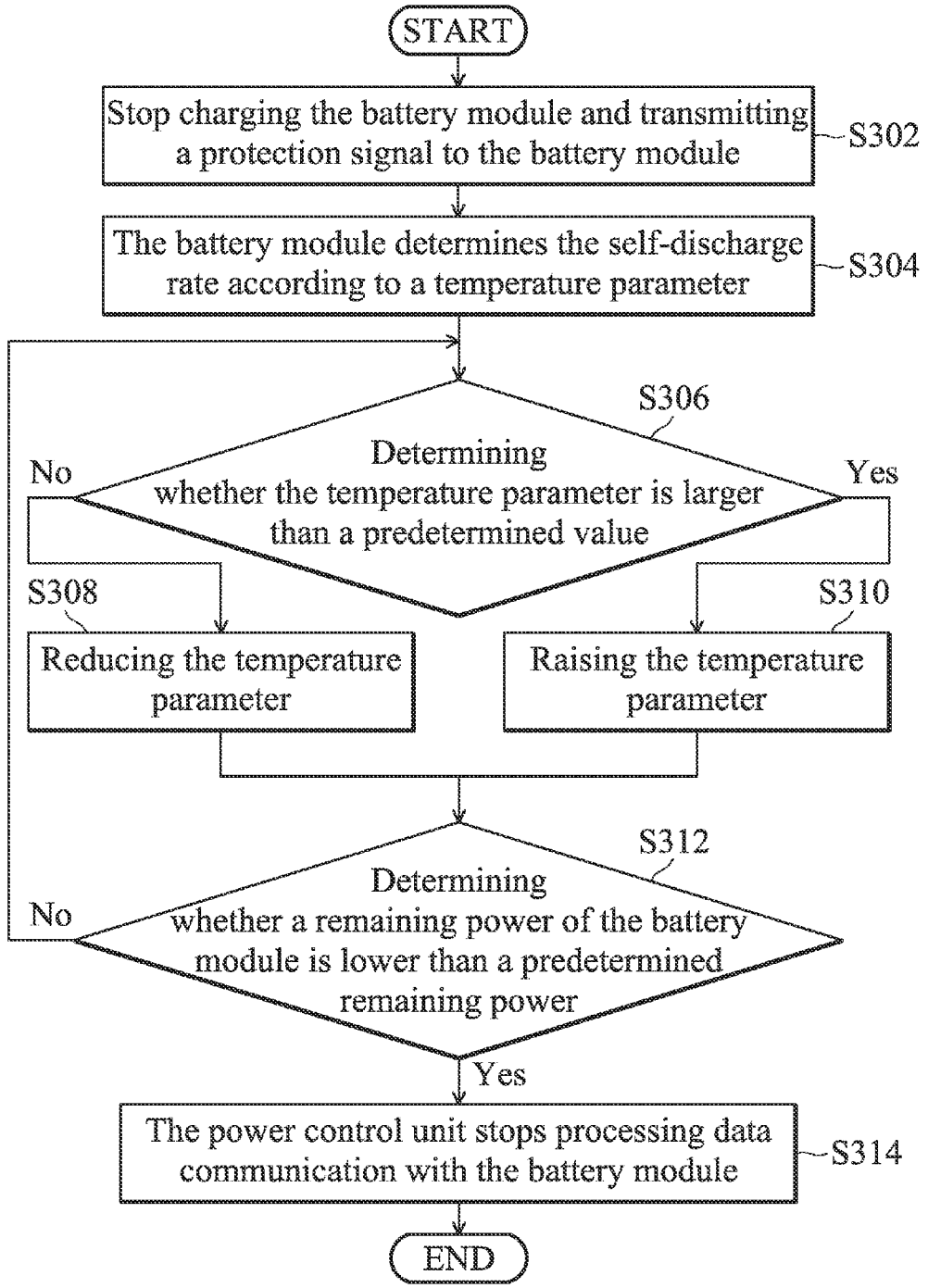
FIG. 3 is the operation flowchart of an embodiment of a method for the electric device 100 shown in FIG. 1.

FIG. 3 is a detailed operation flowchart illustrating an embodiment of the steps S210 and S212 of the operation flowchart shown in FIG. 2. In step S302, the power control unit 102 stops providing the charging power $P_{charge}$ to the battery module 104 (step S210 in FIG. 2), and transmits the protection signal $S_{p2}$ to the battery module 104. After the battery module 104 has received the protection signal $S_{p2}$, in step S304, the battery module 104 obtains a temperature parameter (such as current operating temperature) for determining the self-discharge rate. Note that, the higher the temperature parameter is, the higher the self-discharge rate is. In some embodiments, when the temperature parameter increases by 10 degrees, the self-discharge rate doubles.

In step S306, the battery module 104 determines whether the temperature parameter is higher than a predetermined temperature value (such as 60 degrees). When the temperature parameter is not higher than a predetermined temperature value, step S308 is performed. Conversely, when the temperature parameter is higher than a predetermined temperature value, step S310 is performed. In step S308, the battery module 104 reduces the value of the temperature parameter in order to reduce the self-discharge rate. On the other hand, in step S310, the battery module 104 raises the value of temperature parameter in order to raise the self-discharge rate. Note that, the embodiment uses the changing of temperature parameters to change the self-discharge rate, however, the invention is not limited thereto.

Because the battery module 104 continues changing the temperature parameters, the battery module 104 can increase its self-discharge rate by increasing the temperature parameter even if the current self-discharge rate corresponding to the actual temperature is low. On the other hand, the self-discharge rate is reduced when the temperature parameter is higher than the predetermined temperature value, in order to prevent the battery module 104 from discharging too fast.

Next, in step S312, the battery module 104 determines whether the current residual power is lower than a predetermined power (e.g., 10% of the battery capacity). When the residual power of the battery module 104 is not lower than the predetermined power, then step S306 is performed for dynamically adjusting the self-discharge rate. On the contrary, when the residual power of the battery module 104 is lower than the predetermined power, step S314 is performed, and the dynamic adjustment of the self-discharge rate is stopped.

In some embodiments, whether the duration period is more than a predetermined time (e.g. 720 hours) may be further determined at the step S312. For example, when the power control unit 102 stops providing the charging power $P_{charge}$ to the battery module 104 in step S302, a counting unit is activated to obtain a duration period of the dynamic adjustment of the self-discharge rate. Once the battery module 104 determines that the duration period of the dynamic adjustment of the self-discharge rate has exceeded the predetermined time, the battery module 104 stops dynamically adjusting the self-discharge rate, and step S314 is performed.

In step S314, the power control unit 102 stops communicating with the battery module 104, so that the communication interface is not connected to the battery module 104, and the self-discharge rate will be reduced. And then, step S214 in FIG. 2 is performed. Similarly, if a user removes the external power source $P_{ex}$ from the power control unit 102 after the step S314, the power control unit 102 will return to communicate with the battery module 104.

Figure 4B:
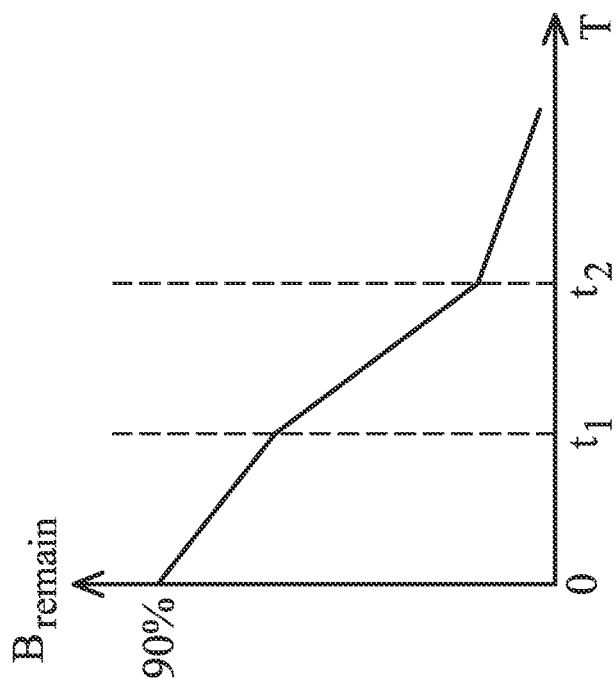
FIG. 4B is a diagram illustrating an embodiment of the relation between the battery module residual power and time for the electric device 100 in the second status.
Figure 4A:
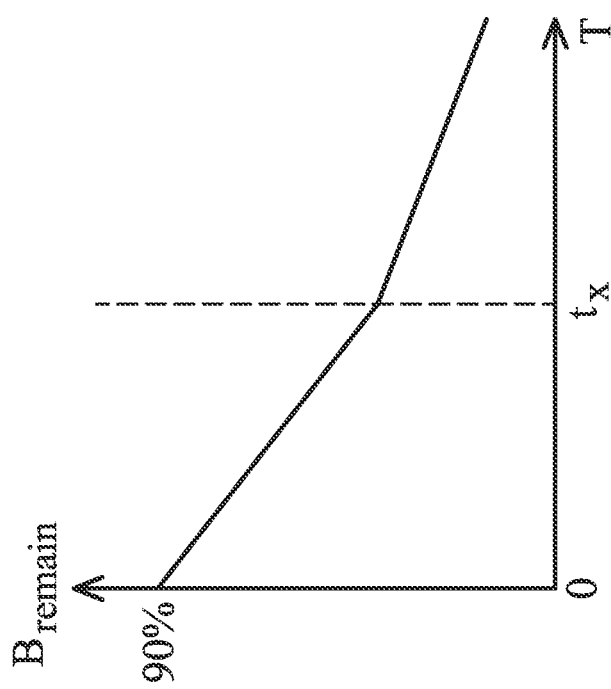
FIG. 4A is a diagram illustrating an embodiment of the relation between the battery module residual power and time for the electric device 100 in the first status.

The dynamic adjustment of the self-discharge rate of the present invention is illustrated by referring to the following detailed description with reference to FIGS. 4A and 4B. FIG. 4A is a schematic diagram illustrating dynamic adjustment of the self-discharge rate of the battery module 104 of the electronic device 100 shown in FIG. 1, and the time $t_x$ is the predetermined time. As shown in FIG. 4A, the residual power of the battery module 104 is 90% at time 0, and decreases with time. Note that, the self-discharge rate of the battery module 104 before time $t_x$ is higher than the self-discharge rate after time $t_x$, because the power control unit 102 stops communicating with the battery module 104 after time $t_x$ (such as the step S314 in FIG. 3), so that the power consumption of the battery module 104 is reduced.

On the other hand, FIG. 4B is a schematic diagram illustrating dynamic adjustment of the self-discharge rate of the battery module 104 of the electronic device 100 shown in FIG. 1, wherein the time $t_1$ is the time when a user removes the external power source $P_{ex}$, and the time $t_2$ is the time when a user connects the external power source $P_{ex}$ back to the power control unit 102. Note that, the self-discharge rate of the battery module 104 after time $t_1$ is higher than the self-discharge rate before time $t_x$, because the power control unit 102 is changed to provide the power $P_{bat}$ of the battery module 104 as the operating power PW to the main system 106 after time $t_1$, so that the power consumption of the battery module 104 increases. Also, the self-discharge rate of the battery module 104 after time $t_2$ is lower than the self-discharge rate before time $t_2$, because the power control unit 102 provides the operating power PW to the main system 106 via the external power source $P_{ex}$ after time $t_2$, so that the power consumption of the battery module 104 is reduced.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic device with power control function for executing a process, comprising:
   a main system, processing the process;
   a power control unit, providing an operating power to the main system via an external power source when the power control unit is connected to the external power source, and detecting whether the power control unit has received a battery protection signal; and
   a battery module, discharging with a self-discharge rate when the battery module has received the protection signal,
   wherein when the power control unit has not received the battery protection signal, the power control unit provides a charging power to the battery module via the external power source, and
   wherein when the power control unit has received the battery protection signal, the power control unit does not provide the charging power to the battery module, and transmits the protection signal to the battery module;
   wherein the battery module determines the self-discharge rate according to a temperature parameter, and the self-discharge rate is in direct proportion to the temperature parameter,
   wherein when the battery module has received the protection signal, the battery module further determines whether the temperature parameter is higher than a predetermined value,
   wherein when the temperature parameter is higher than a predetermined value, the battery module raises the temperature parameter, and
   wherein when the temperature parameter is not higher than a predetermined value, the battery module reduces the temperature parameter.

2. The electronic device of claim 1, wherein when the power control unit is not connected to the external power source, the power control unit provides the operating power to the main system via the battery module.

3. The electronic device of claim 1, wherein when the power control unit provides the operating power to the main system via the battery module, the power control unit keeps detecting whether the power control unit is connected to the external power source.

4. The electronic device of claim 1, wherein the power control unit processes data communications with the battery module via a communication interface.

5. The electronic device of claim 4, wherein when the battery module has received the protection signal, the battery module further determines whether a residual power of the battery module is lower than a predetermined residual power, and
   wherein when the residual power of the battery module is lower than the predetermined residual power, the power control unit stops processing data communications with the battery module.

6. The electronic device of claim 5, wherein after the power control unit stops processing data communications with the battery module, the power control unit keeps detecting whether the power control unit is not connected to the external power source when the power control unit is not connected to the external power source.

7. The electronic device of claim 6, wherein when the power control unit is not connected to the external power source, the power control unit returns to process data communications with the battery module.

8. The electronic device of claim 4, wherein when the battery module has received the protection signal, the battery module starts counting a self-discharge duration, and
   wherein when the self-discharge duration has exceeded a predetermined duration, the power control unit stops processing data communications with the battery module.

9. The electronic device of claim 8, wherein after the power control unit stops processing data communications with the battery module, the power control unit keeps detecting whether the power control unit is connected to the external power source when the power control unit is not connected to the external power source.

* * * * *